US012601446B2

(12) United States Patent  (10) Patent No.: US 12,601,446 B2
Krabbe  (45) Date of Patent: Apr. 14, 2026

(54) BRAKING SYSTEM FOR HOLDING A SCREEN

(71) Applicant: ERGONOMIC SOLUTIONS INTERNATIONAL LIMITED, Epsom (GB)

(72) Inventor: Per Krabbe, Aabybro (DK)

(73) Assignee: ERGONOMIC SOLUTIONS INTERNATIONAL LIMITED, Epsom (GB)

( * ) Notice: Subject to any disclaimer, the term of this patent is extended or adjusted under 35 U.S.C. 154(b) by 0 days.

(21) Appl. No.: 18/689,906

(22) PCT Filed: Jul. 13, 2022

(86) PCT No.: PCT/EP2022/069675
§ 371 (c)(1),
(2) Date: Mar. 7, 2024

(87) PCT Pub. No.: WO2023/036499
PCT Pub. Date: Mar. 16, 2023

(65) Prior Publication Data
US 2024/0369177 A1  Nov. 7, 2024

(30) Foreign Application Priority Data

Sep. 9, 2021 (DK) ........................... PA 2021 70449

(51) Int. Cl.
*F16M 11/04*  (2006.01)
(52) U.S. Cl.
CPC ..... *F16M 11/046* (2013.01); *F16M 2200/027* (2013.01)
(58) Field of Classification Search
CPC . F16M 11/046; F16M 2200/027; F16M 11/18
(Continued)

(56) References Cited

U.S. PATENT DOCUMENTS 1,091,615 A * 3/1914 Angell ................... F16M 11/18
248/404
6,119,605 A 9/2000 Agee
(Continued)

FOREIGN PATENT DOCUMENTS

EP  1832801 A2  9/2007
EP  1 860 366 A2  11/2007
(Continued)

OTHER PUBLICATIONS

International Search Report for PCT/EP2022/069675 mailed on Dec. 2, 2022.
Written Opinion for PCT/EP2022/069675 mailed on Dec. 2, 2022.

*Primary Examiner* — Christopher Garft
(74) *Attorney, Agent, or Firm* — Schmeiser, Olsen & Watts, LLP

(57) ABSTRACT

A braking system for holding a screen, wherein either on the holder or the screen an elongate base is provided, the elongated base in contact with a first wheel mounted on the second one of the holder or the screen, so that when the base is moved relative to the first wheel, the first wheel is rotated, and a brake module including a second wheel and a third wheel, the first wheel always being in contact with either the second wheel or the third wheel, wherein the second wheel contacts with an adjustable friction brake, and the brake module being rotatable relative to either the screen or the holder, wherein the second wheel can be adjusted to be in contact with the first wheel, to a position not in contact with the first wheel, but instead the third wheel being in contact with the first wheel or vice versa.

8 Claims, 7 Drawing Sheets

(58) Field of Classification Search
USPC .................................. 248/125.1, 292.12, 404
See application file for complete search history.

(56) References Cited

U.S. PATENT DOCUMENTS

| | | | |
|---|---|---|---|
| 2007/0205345 A1* | 9/2007 | Chen ...................... | F16M 11/24 |
| | | | 248/297.31 |
| 2007/0278364 A1* | 12/2007 | Jang ................... | F16M 11/2021 |
| | | | 248/161 |
| 2008/0174943 A1 | 7/2008 | Hirasawa et al. | |
| 2009/0039227 A1* | 2/2009 | Li ........................ | G03B 17/561 |
| | | | 248/422 |
| 2010/0008032 A1 | 1/2010 | Wang | |
| 2017/0205021 A1 | 7/2017 | Liu et al. | |

FOREIGN PATENT DOCUMENTS

| | | |
|---|---|---|
| EP | 1862723 A2 | 12/2007 |
| EP | 2 620 689 A1 | 7/2013 |
| WO | 2008/004759 A2 | 1/2008 |
| WO | 2021/159112 A1 | 8/2021 |

* cited by examiner

70

62

01

61

75

BRAKING SYSTEM FOR HOLDING A SCREEN

CROSS-REFERENCE TO RELATED APPLICATIONS

This application claims priority to PCT Application No. PCT/EP2022/069675, having a filing date of Jul. 13, 2022, which is based DK Application No. PA 2021 70449, having a filing date of Sep. 9, 2021, the entire contents both of which are hereby incorporated by reference.

FIELD OF TECHNOLOGY

This following relates to a braking system which enables a stepless vertical positioning of a screen/display and a holding of this position relative to a holder/stand. When positioning in the vertical direction, only the weight of the screen/display is carried, and in the downward direction, it is only the frictional resistance that must be overcome. The positioning of the screen/display can be set up while sitting or standing in a comfortable working position and maintaining the position of the screen/display in relation to the holder is self-activating, and therefore does not require manual operation for connecting or disengaging the lock.

BACKGROUND

It is a known issue that a screen/display must be correctly positioned to get the correct working position and proper comfort. Every user is of different height, and therefore there is no standard height setting for screen/display that suits all individuals. An adjustment of the position of the screen/display in the vertical direction in relation to the keyboard, eye height is a significant improvement in adjusting the operating position.

Several solutions to this problem have been proposed. There are holders that have simple rocker brackets for angling the screen/display, and if several of these rocker brackets are combined, a specific kind of height adjustment of the position can be achieved. The disadvantage of these solutions is that in order to position the screen/display, a friction/resistance in the rocker brackets must be overcome, which during friction must maintain an inclination of the screen and, additionally, the weight of the screen/display must be lifted, which means that the positioning of the screen becomes cumbersome, and not very precise. Often a user does not set the screen/display due to the inconvenience, and therefore does not have an optimally designed workspace.

There are likewise devices that can be mounted on the holder and screen, where the display and holder can be positioned relative to each other in fixed positions and locked with screws, springs, or mechanical locks. These solutions have the disadvantage that the device for holding or releasing the position is designed so that operation takes place at the rear of the screen/display, which is inconvenient, since the user is sitting/standing in front of the screen/display at a distance. The user therefore sits in front and adjusts the screen upwards, where partial resistance in the holding mechanism as well as the weight of the screen must be overcome, which can be heavy. When the screen is to be adjusted downwards, a trigger on the back of the screen/display must be operated, which is considered to be inconvenient.

In addition to the above, there are solutions for positioning the screen/display, in that these have a fixed or very slightly movable vertical adjustment option that requires operation with two hands to overcome friction, resistance, and weight from the rocker bracket and screen/display, respectively, as mentioned above. All this is mounted on an adjustable worktable, which helps the screen to be positioned at vertical height. Such solutions have the disadvantage that it is difficult to achieve a satisfactory working position, as the ratio between keyboard/control panel, eye height, and sitting/standing position can rarely be optimal.

It will therefore be very advantageous to have a device mounted on/between the screen/display and the holder, which enables a step-free, simple, and frictionless adjustment upwards in the vertical direction, and with minimal resistance in the downward direction, and which at the same time does not require other operation for setting to a position other than sliding to the screen/display.

US 2017/205021 A1, U.S. Pat. No. 6,119,605 A and 03 EP 1 860 366 A2 each discloses alternative solutions for positioning a screen display based on a rack and pinion gear arrangements for stepless adjustments in the vertical direction.

SUMMARY

An aspect relates to a solution and a method for enabling a random and step-free adjustment of the height of a screen/display relative to a holder and containing a self-acting device for maintaining the set position.

Embodiments of the present invention comprise an arrangement of components between a holder and screen/display, which enables a step-free positioning in the vertical upward and downward direction between holder and screen/display, where the adjusting force to be overcome upwards primarily consists of the weight of the screen/display, and a step-free downward positioning, where the adjusting force to be overcome is primarily an overcoming of the resistance force for the holding position. The arrangement of components further comprises a device for switching between two states, where one state ensures free movement of components, and the other state ensures that movement of components is braked or restrained against movement through, for example, a brake element.

Embodiments of the present invention address the problem by providing a braking system for holding a screen in a desired position relative to a fixed holder, and that an elongated base, e.g., an elongated toothed base (hereinafter: "base" or "elongated base") is provided, either on the holder or the screen, wherein the elongated base is in contact with a first wheel mounted on the second one of the holder or screen, so that when the base is moved relative to the first wheel, the first wheel is rotated, and further providing a braking module, the braking module comprising a second wheel and a third wheel, the first wheel being in contact with either the second wheel or the third wheel, the second wheel always being in contact with an adjustable friction brake, wherein the second and third wheels are mounted on the braking module and that the braking module is rotatable relative to either the screen or the holder, wherein the second wheel can be brought from a position where it is in contact with the first wheel, to a position where the second wheel is not in contact with the first wheel, but instead the third wheel is in contact with the first wheel or vice versa.

Alternatively, one or more of the aspects may be achieved by providing a braking system for holding a screen in a desired position relative to a fixed holder, wherein the braking system comprises a first wheel configured to be mounted on one of the fixed holders or the screen, an elongated base to be provided on the other of the fixed holder or the screen, with the elongated base in contact with the first wheel, so that when the elongated base is moved relative to the first wheel, the first wheel is rotated, and a braking module comprising a second wheel and a third wheel, wherein the second wheel is arranged in contact with an adjustable friction brake, wherein the braking module is adapted to be rotatably arranged with the first wheel to be in contact with either the second wheel or the third wheel, and rotatably arranged relative to either the screen or the holder to be rotated between a position where first wheel is in contact with the second wheel and a position where the first wheel is in contact with the third wheel.

In one embodiment, the base may be located on the screen and the braking element on the holder. It is an advantage that the force to be established by a position change of the height of the screen, will be the weight of the screen/display, as well as the weight of the part of the components that contains the base, which allows the positioning to be easy and precise.

If the screen/display is to be positioned in a downward direction, it is primarily the friction in the braking element that must be overcome.

In an embodiment, the base may be located on the holder and the braking element on the screen/display. In this embodiment, a slightly increased force is required in order to position the screen/display in the upward direction, as it is both the screen, the braking element and the wheels that must be overcome. A downward positioning will be the same regardless of whether the tooth is located on the holder or screen/display, as it is primarily the friction in the braking element that must be overcome.

In an embodiment, the braking system can be mounted directly on the screen/display and/or holder.

In one exemplified embodiment, the braking system is made with components that can provide a gear ratio. A small movement of the base will result in a large movement of the braking element (and vice versa).

In one exemplified embodiment, the first wheel has two annulus gears. A small movement of the base having contact with the first annulus gear of the two annulus gears will result in a movement of the first annulus gear and thereby a movement of the second annulus gear of the two annulus gears. The second annulus gear has contact with the wheels in the braking element.

In one embodiment of the braking system, the annulus gears may have different sizes of periphery.

Typically, the first annulus gear will be smaller, i.e., have a smaller periphery than the second annulus gear, whereby a "gear ratio" is obtained, such that a smaller rotation of the first annulus gear results in a greater movement of the periphery of the second annulus gear.

Movement of the base in contact with the smaller periphery of the first wheel will result in greater movement of the large periphery of the first wheel. A large movement of the large periphery of the first wheel ensures a change of the position of the braking element from one outer position to the second outer position. With the first wheel contact with the braking element, this will ensure a desired rapid change of the braking element from one extreme position to the second extreme position and thus from the state of the braking system going from freely rotating components to rotating with resistance and maintaining the screen/display position.

Likewise, the use of the gear ratio, i.e., the difference in periphery, between the components in terms of force, that the position of the screen can be maintained in its position by virtue of influencing the weight of the screen to the system via the base.

In an embodiment, the first wheel can be designed as one of several wheels with, for example, a first annulus gear and/or a second annulus gear mounted on a rotatable shaft.

In one exemplified embodiment, the braking element is a self-acting element, which is locked or released by movement of the base in a downward or upward movement, respectively. This is a significant advantage, as positioning the screen/display does not require further action than moving the screen to the position and subsequently releasing it and the position remains intact and fixed.

In one exemplified embodiment, the braking system is mounted on contact plates (interface) for mounting on the screen/display and holder, respectively, which enables a simple mounting on the screen/display and holder, respectively, by screws and/or clips and/or pins.

In one exemplified embodiment of the braking system, it is possible to adjust the braking force/friction so that retention of position is further ensured, and that the braking function can be adapted to different types of screens in terms of weight and size.

In an embodiment, the friction brake can be built in/integrated in individual components, for example in a cog wheel or friction wheel.

In yet another embodiment, the friction brake can be provided with an indication, a scale or a marking of positions for maintaining a weight which, for example, corresponds to the weight of different sizes of screen/display and/or an indication of a desired friction, for example, an indication of a desired friction to occur in connection with a positioning of the screen/display in a downward direction.

One exemplified embodiment attributes that the force arising from the movement of the base is transferred to the first wheel by friction, or by the base and the first wheel being provided with teeth so that the force is transferred by engagement between the teeth.

In the process of a force transference with friction, there will be no greater requirements for the geometric tolerance between components, but instead there will be specific requirements for the nature of the surfaces with regard to friction, and also what force can be established between the contact surfaces. The nature of the components on the contact surface can provide the necessary friction and durability.

In the case of a power transference with teeth, there will be greater and specified requirements for the tolerance between the components with regard to placement and interaction, and there will be fewer specified requirements for the nature of the surfaces with regard to friction, as a minimum friction between the contact surfaces and the braking effect will occur through the contact of the components to a friction brake. This friction between, in this case, the first wheel and the second or third wheel, can be minimized through material selection of components or by applying a coating to the contact surfaces—for example Teflon—to minimize friction and increase durability.

One exemplified embodiment attributes, where the force which arises from the movement of the first wheel, is transferred to the second or third wheel by friction, or by the movement of the first wheel being transmitted to the second or third wheel by teeth, so that the force is transferred by engagement between the teeth.

In the case of a force transference with friction, there will be no greater requirements for the geometric tolerance between the components, but instead there will be specific requirements for the nature of the surfaces with regard to friction, and also what force can be established between the contact surfaces. The nature of the components on the contact surface can provide the necessary friction and durability.

In the process of a power transference with teeth, there will be greater and specified requirements for the tolerance between the components with regard to location and interaction, and there will be less specific requirement for the nature of the surfaces with regard to friction, as a minimum friction between the contact surfaces will be sought. The braking effect will occur through the contact of the components to a friction brake. This friction between, in this case, the first wheel and the second or third wheel, can be minimized through material selection of components, or by applying a coating to the contact surfaces—for example Teflon—to minimize friction and increase durability.

Or alternatively described:

In one embodiment of the braking system, a linear movement of the elongated base is transferred to a circular movement of the first wheel by frictional force arising between the elongated base and the first wheel.

In one embodiment of the braking system, a rotational movement of the first wheel is transferred to the second wheel or the third wheel by frictional force arising between the first wheel and the second wheel or between the first wheel and the third wheel.

In one embodiment of the braking system, the first wheel and the elongated base comprise teeth adapted to engage with each other for transferring a circular movement to a linear movement or vice versa.

In one embodiment of the braking system, the first wheel and the second wheel, and/or the first wheel and the third wheel comprise teeth adapted to engage with each other for transferring a circular movement from one wheel to the other.

In an embodiment, the force which arises from the movement of the first wheel is transferred to the second or third wheel by belt drive or link. This can minimize the requirements for the tolerances when placing the components and provides a cheaper construction.

In an embodiment, the braking module is mounted on either the holder or the screen, partly by a rotatable attachment and partly by the provision of a slot in which an attachment is provided, so that the rotational movement of the brake module is limited by the slot. The rotatable attachment of the braking module ensures that the braking system can change position from a free rotation of components in the system, to a position where rotation of the components takes place with friction/resistance. The slot ensures in its design that the rotation of the braking module is limited respectively to an outer position in the one and the other direction. In a design with teeth, this will ensure an optimal and safe engagement between the annulus gears with maximum force transference as a result, and in a design with friction, it will ensure that there is a safe, stable, and well-defined contact surface with friction, with maximum force transference as a result.

For example, in one embodiment of the braking system, the braking module is rotational mountable on either the holder or the screen, by provision of a slot in the holder, the screen or the braking module, wherein the braking module is attached to the holder or the screen via the slot, and wherein the rotational movement of the brake module is limited by the slot.

In an exemplified embodiment, the first wheel comprises two or more peripheries, which can be brought into contact with the elongated base and the second or third wheel, either via friction or via teeth. This ensures that the transfer is compact and does not take up much space.

The gear ratio created through the common shaft in the peripheral dimension attributes either greater force at a smaller motion and/or a larger geometric motion in the larger peripheries, relative to the smaller periphery in smaller space.

In an embodiment, it is attributed that the friction brake is integrated in the first and/or the second wheel.

In an embodiment, it is attributed that the friction brake is integrated in the first, second, or third wheel. Most obvious is to place the friction brake in the second wheel, where the friction brake has a common center shaft with the second wheel. This placement saves space in the construction and saves components with a reduction in costs as a result.

The friction brake can also be placed in the first wheel, where the friction brake has a common center shaft with the first wheel. With this placement, it saves space in the construction and saves components with a reduction in costs as a result.

The friction brake can be implemented with clearance in one direction of rotation and with resistance/friction in the other direction of rotation, to ensure maintenance of a set placement.

The construction can thereby be made cheaper by, for example, fewer components being included in the overall braking system.

The friction brake will typically brake equally in both directions of rotation, but since it is mounted on a plate that can tilt from side to side, the effect in one direction will not be felt until full braking has occurred, due to the movement of engagement from the first wheel to the second wheel.

In an embodiment, it is attributed that the first wheel and/or second wheel and/or third wheel and/or friction brake is an integrated unit. A structure with either a first wheel and/or second wheel and/or third wheel and/or a friction brake with a common center shaft around the center shaft of the first wheel, the first wheel on an outer periphery having a contact surface to the base, and wherein the first wheel on an inner periphery has a contact surface for either the third wheel and/or the second wheel, and wherein the friction brake always has contact with the second wheel, or is integrated in the second wheel, will result in saving space and will ensure great accuracy in the placement of components with a consequent better functionality, safety, and durability.

The components included in the braking system can be made of metal and/or plastic and/or composite material. This will ensure that the quality, strength, fit and price of the braking system can be optimized according to need and specification.

BRIEF DESCRIPTION

Some of the embodiments will be described in detail, with references to the following Figures, wherein like designations denote like members, wherein.

Figure 5:
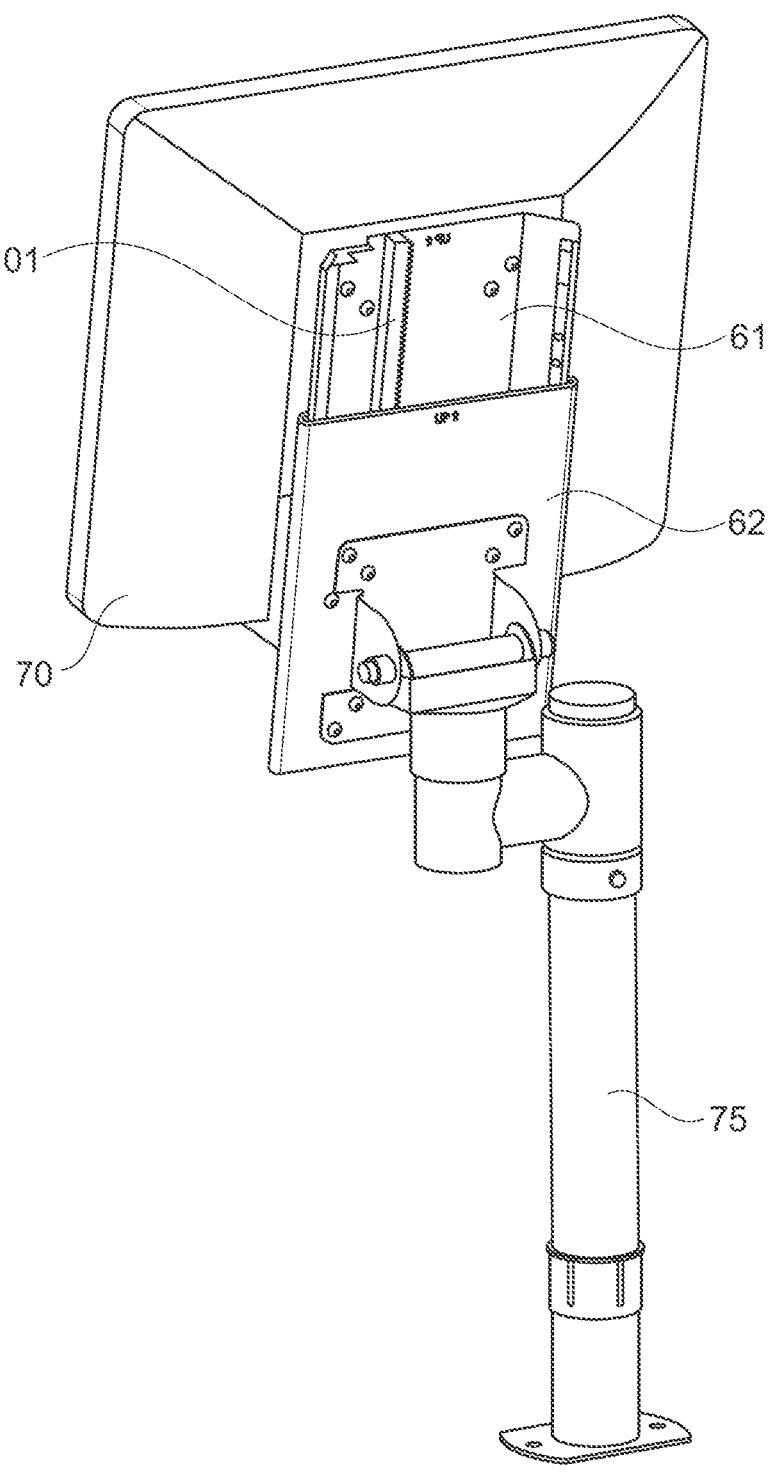
Figure 6:
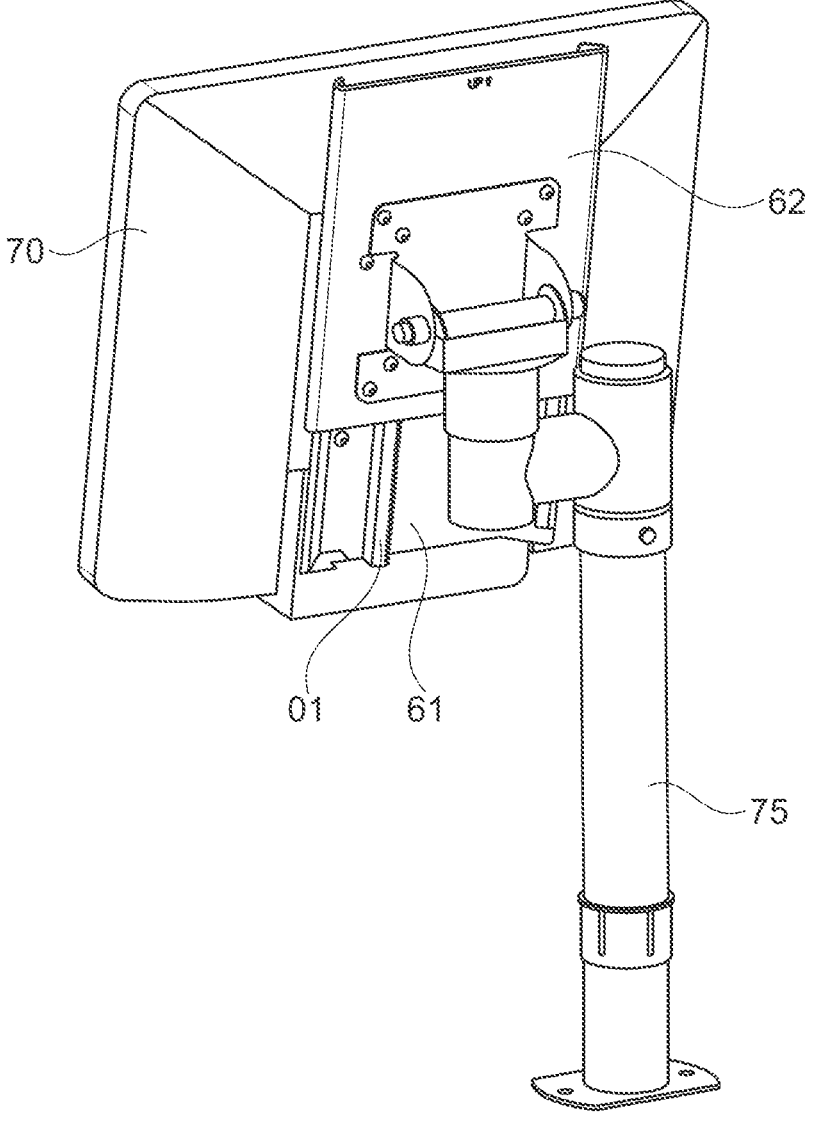

FIG. 5 illustrates an embodiment of the described braking system where contact plates, mounted respectively on a holder and a screen/display, show the position of the braking system and the displacement of the system plates at maximum upward height displacement; and FIG. 6 illustrates an embodiment of the described braking system, where contact plates mounted respectively on a holder and a screen/display, shows the position of the braking system and the displacement of the contact plates at maximum downward height displacement.

DETAILED DESCRIPTION

FIGS. 1-6 show an embodiment of the braking system with teeth and cog wheel.

Figure 2:
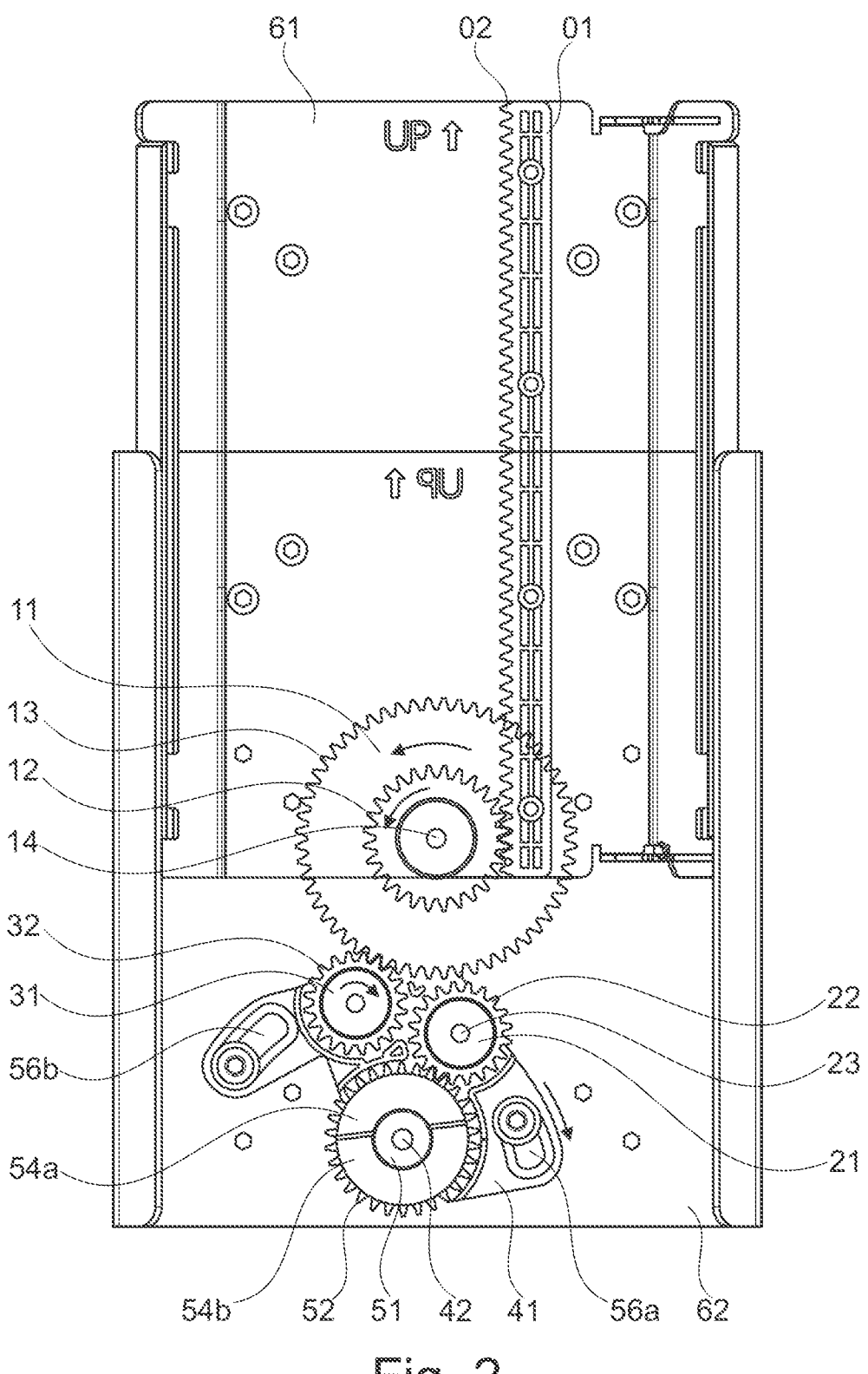
FIG. 2 illustrates an embodiment of the described braking system, where it is mounted on contact plates for respectively the base and braking element, shows the position of the braking element by a movement of the base upwards.

The braking system can be mounted directly on the screen/display and holder but is shown in the figures mounted on two contact plates (61 and 62)-see FIG. 2, which can be mounted respectively on the holder (75) and screen/display (70), and, among others in the figures, shown in the highest and lowest positioning of the screen/display, respectively (70).

Figure 1A:
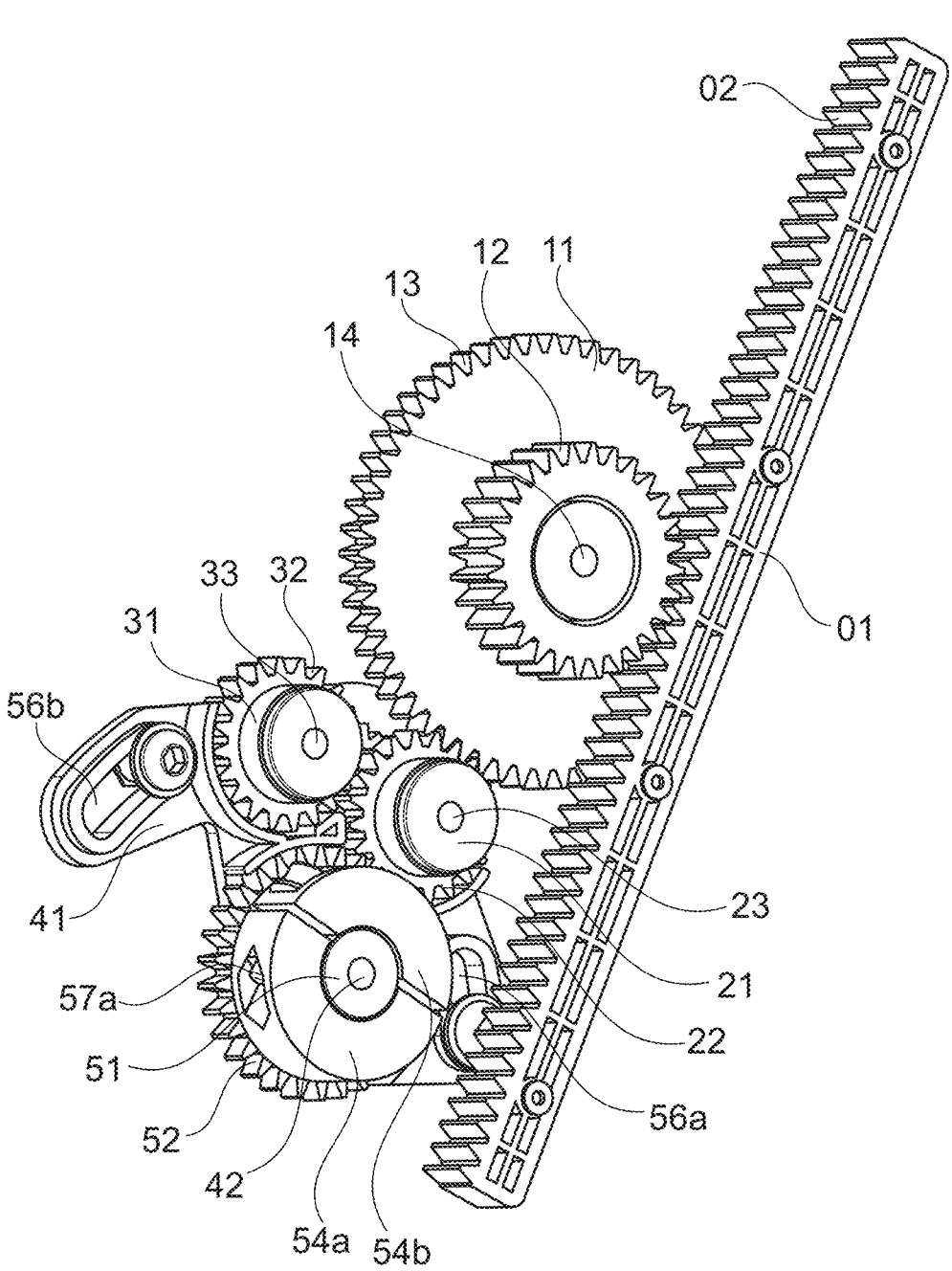
FIG. 1A illustrates an embodiment of the described braking system.
Figure 1B:
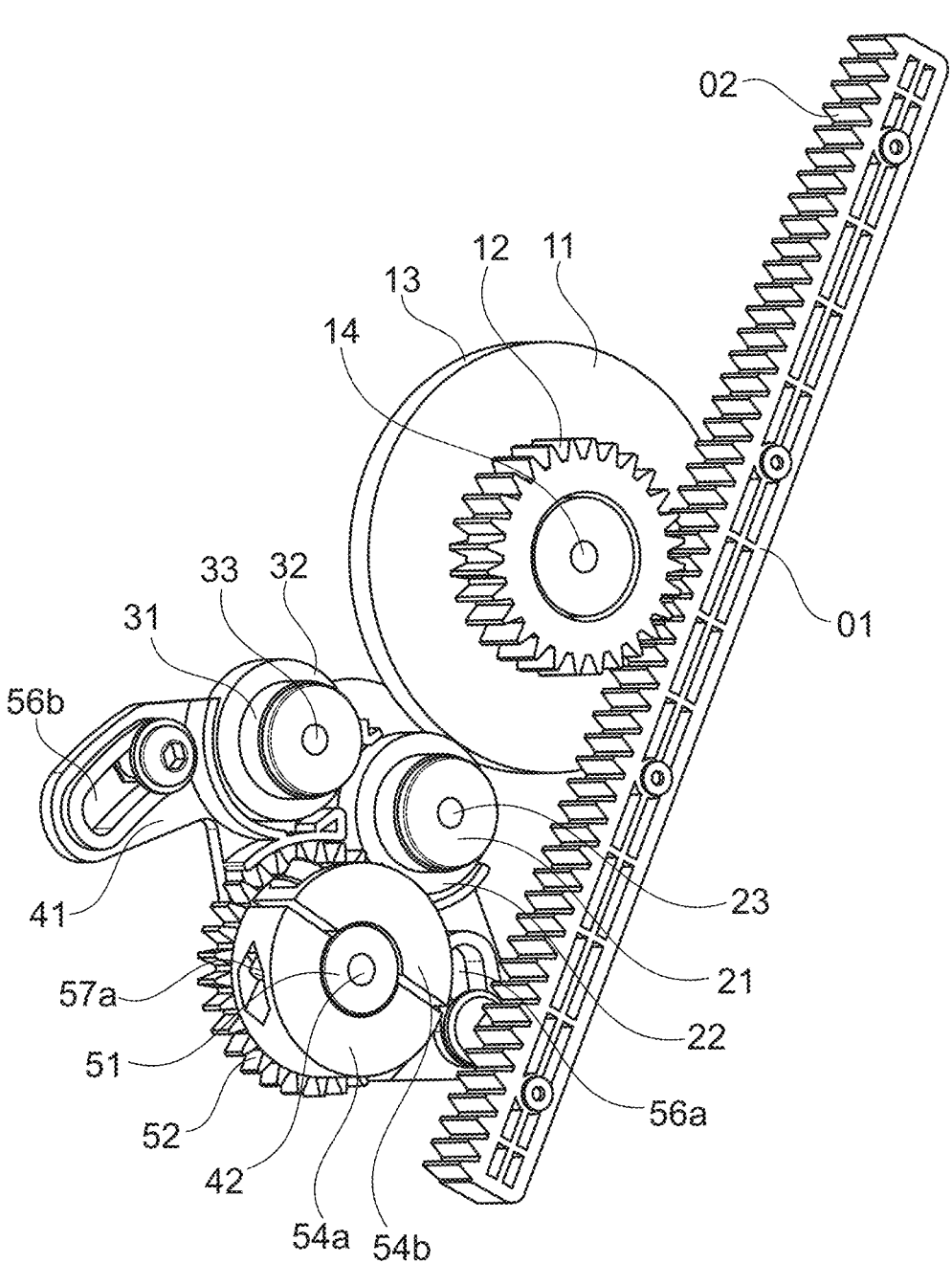
FIG. 1B illustrates another embodiment of the described braking system.

The braking system is shown in FIG. 1A and FIG. 1B, where the individual components are driven by a cog wheel. The tooth (01) is constructed as a toothed rack, where the teeth (02) of the rack engage with the first annulus gear (12) of the first wheel. By moving the tooth (01) in one direction—up or down—the first wheel (11) is turned in a clockwise direction (to the left) or clockwise (to the right).

The first annulus gear (12) of the first wheel has the same center shaft (14) as the second annulus gear (13) of the first wheel. When rotating the first annulus gear (12) of the first wheel, the second annulus gear (13) of the first cog wheel is also rotated synchronically, but due to gear ratio, with greater speed and geometric travel than the first annulus gear (12) of the first cog wheel. This is to ensure that a slight movement of the base (01)—in the direction up or down— through the gear ratio, will ensure a greater travel in the second annulus gear (13) of the first wheel. The larger travel will ensure a rapid change in position of the brake element (41) from one outer position to another.

The second annulus gear (13) of the first wheel may engage the annulus gear (22) of the second wheel and the annulus gear (32) of the third wheel, respectively.

When the first wheel (11) rotates clockwise, the second annulus gear (13) of the first wheel engages with the annulus gear (22) of the second wheel, and when the first wheel (11) rotates counterclockwise, the second annulus gear (13) of the first wheel engages with the annulus gear (32) of the third wheel. The annulus gear (22) of the second wheel always engages the annulus gear (52) of the friction brake. This ensures that resistance or braking action is always provided when turning the second wheel (21). A third wheel (31) can be turned freely. When the first wheel (11) rotates clockwise, the annulus gear (22) of the second wheel engages with the second annulus gear (13) of the first wheel and the movement of the first wheel (11) is braked.

When the first wheel (11) rotates counterclockwise, the annulus gear (32) of the third wheel engages with the second annulus gear on the first wheel (13), and therefore the first wheel (11) can be rotated freely.

The braking element (41) is mounted on a shaft (42) and can be rotated around this shaft (42) clockwise (to the right), whereby the annulus gear (32) of the third wheel engages with the second annulus gear (13) of the first wheel and counterclockwise (to the left), whereby the annulus gear (22) of the second wheel engages the second gear ring (13) of the first wheel. The maximum fluctuation of the braking element (41) in one or the other direction is determined by the length of the slot (56a and 56b). The slot (56a and 56b) ensures that there is a controlled engagement between the second annulus gear (13) of the first wheel and respectively the annulus gear (22) of the second wheel, and the annulus gear (32) of the third wheel.

When the second annulus gear (13) of the first wheel engages with the annulus gear (22) of the second wheel, and a change of direction occurs on the rotation of the first wheel (11) from a clockwise to counterclockwise direction, the resistance/braking in the second wheel (21) rotation ensures that second wheel (21) is guided without rotation by the direction of rotation.

The second wheel (21) mounted clockwise on the braking element (41), will thus guide the braking element (41) in the same direction by the rotation of the braking element (41) around the shaft (42), to its outermost position and ensure a change of position of the braking element (41) to a position wherein the annulus gear (22) of the second wheel is no longer engaged with the second annulus gear (13) of the first wheel, and wherein the annulus gear (32) of the third wheel engages the second annulus gear (13) of the first wheel.

When the second annulus gear (13) of the first wheel engages the annulus gear (32) of the third wheel, and a change of direction occurs on the rotation of the first wheel (11) from a counterclockwise direction to clockwise, the third wheel (31), which is mounted on the braking element (41) the third wheel will be moved a bit counterclockwise, and the braking element (41) is guided in the same direction by the rotation of the braking element (41) around the shaft (42), wherein the annulus gear (22) of the second wheel, will engage the second annulus gear (13) of the first wheel, and the continued movement of the first wheel (11) clockwise will cause the second annulus gear (13) of the first wheel to guide the third wheel (31), which is mounted on the braking element (41), in a counterclockwise direction, and thus the braking element (41), will be moved to its outermost position by rotation around the shaft (42). A position change of the braking element (41) from one position to another position is ensured. When the second annulus gear (13) of the first wheel engages with the annulus gear (22) of the second wheel, the first wheel (11) is braked in its movement clockwise.

The friction brake (51) in the figure is mounted on the rotation shaft (42) of the braking element and achieves a braking effect by clamping the friction elements (54a and 54b) on the rotation shaft (42) and with a consequent resistance and a braking effect as a result. The clamping force and thus the friction can be respectively determined by tightening and loosening the adjusting screw (57a and 57b).

In FIG. 2, the braking system is shown mounted on contact plates (61 and 62), where the base (01) is moved in an upward motion. The base is mounted on the first contact plate (61) while other components are mounted on the second contact plate (62). The abutment plates (61 and 62)

are positioned relative to each other so that the base (01) has reached close to its outermost position upwards.

The direction of rotation is displayed respectively on the first (11), second (21) and third wheels (31), as well as movement and outer position of the braking element (41) by movement of the base (01) in an upward motion.

The figure shows the engagement between the annulus gear (32) of the third wheel and the second annulus gear (13) of the first wheel. The second wheel is not shown with the direction of rotation, as the annulus gear (22) of the second wheel is released from the second annulus gear (13) of the first wheel and is thus not affected for rotation. The braking element (41) is positioned in its outer position to one side to control the engagement between the annulus gear (32) of third wheel and the second annulus gear (22) of the first wheel.

Figure 3:
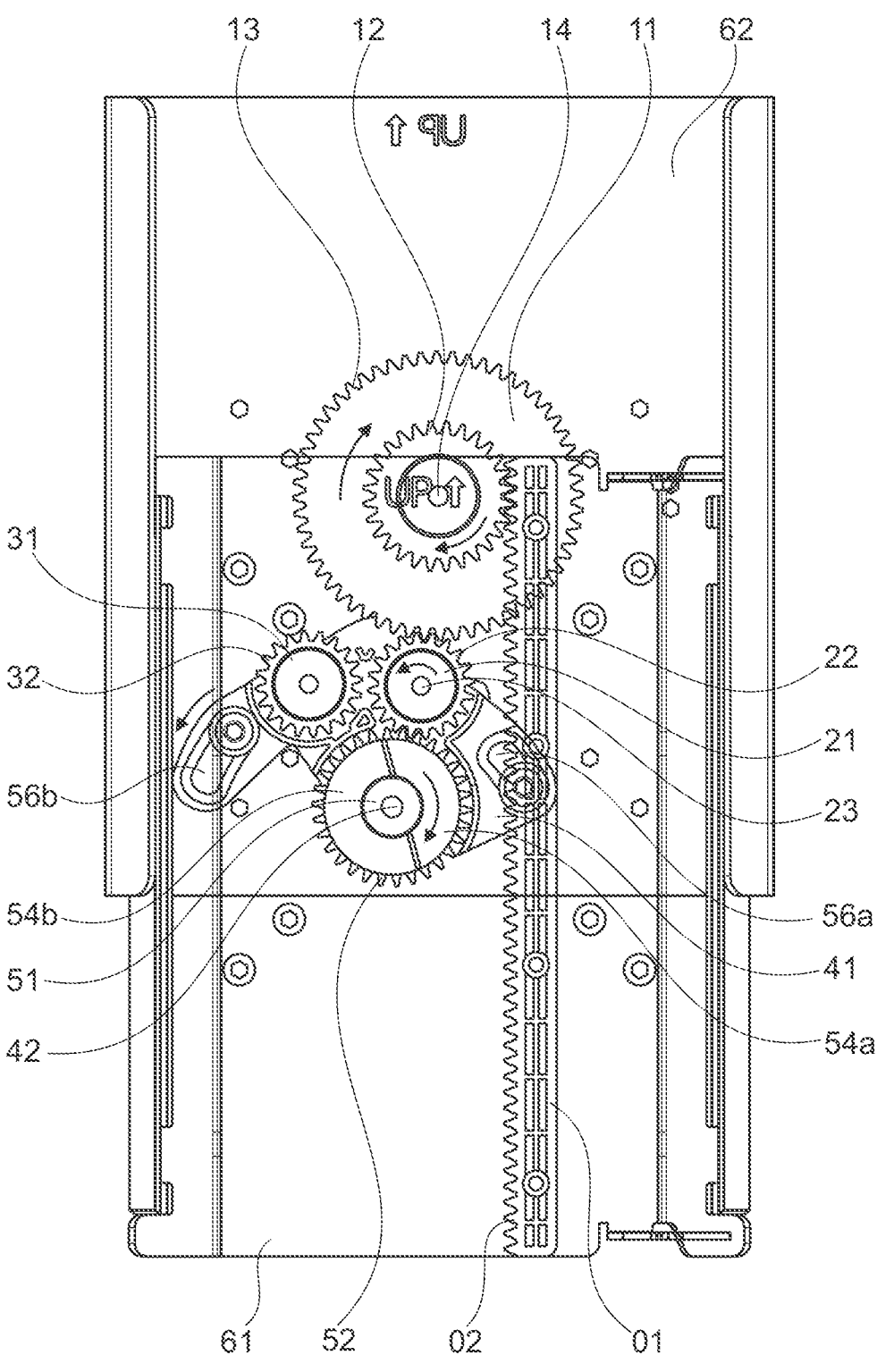
FIG. 3 illustrates an embodiment of the described braking system, wherein it is mounted on contact plates for a base and brake element respectively, showing the position of the braking element by a downward movement of the base.

In FIG. 3 the braking system is shown mounted on contact plates (61 and 62), where the base (01) is moved in a downward motion. The base (01) is mounted on the first contact plate (61), while other components are mounted on another contact plate (62). The abutment plates (61 and 62) are positioned relative to each other so that the base (01) has reached close to its outermost position downwards.

The direction of rotation is shown on the first, second and third wheels respectively, as well as the movement and outer position of the braking element (41) by moving the base (01) in a downward motion. The figure shows the engagement between annulus gear (22) of the second wheel and the second annulus gear (13) of the first wheel. The third wheel is not shown in the direction of rotation, as the annulus gear (32) of the second wheel is released from the second annulus gear (13) of the first wheel and is thus not affected for rotation. The braking element (41) is positioned in its outer position to the other side to control the engagement between the annulus gear (22) of the second wheel and the second annulus gear (13) of the first wheel.

The direction of rotation is marked on the friction brake (51), as this is rotated by the engagement between the annulus gear (52) of the friction brake, and the annulus gear (22) of the second wheel. In the absence of movement in the base (01), there will be no rotation in the friction brake.

Figure 4:
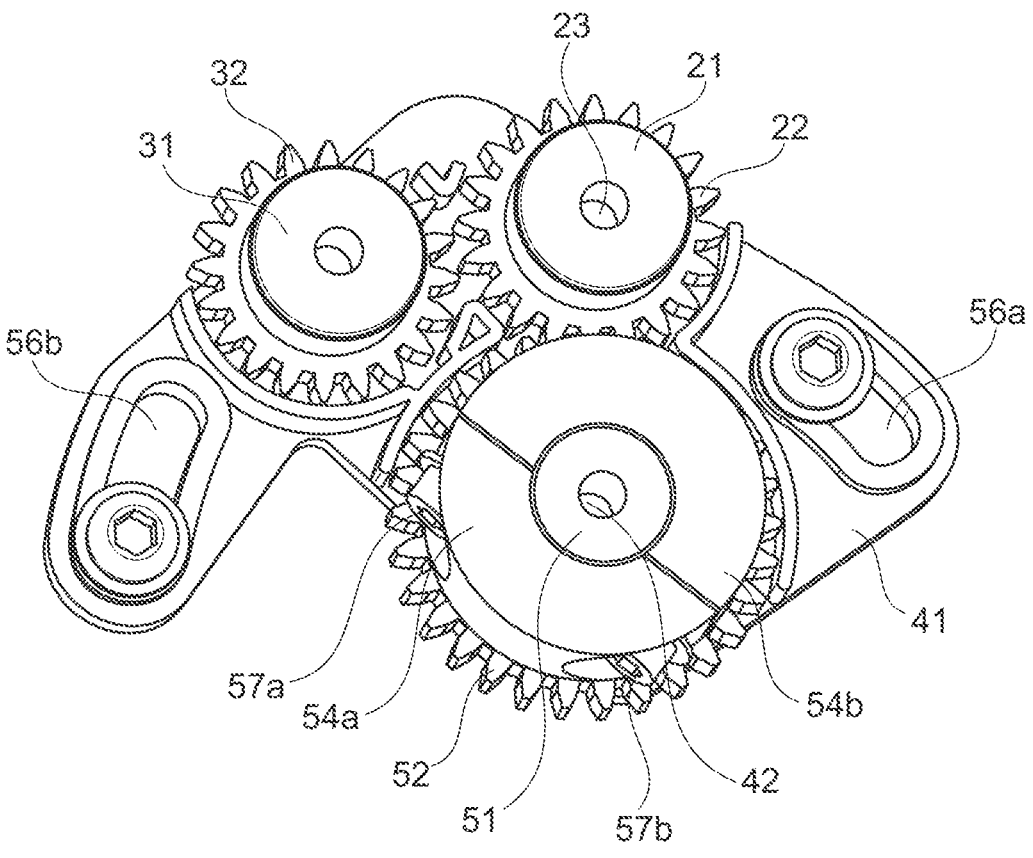
FIG. 4 illustrates an embodiment of the braking element.

In FIG. 4 the braking element (41) is shown.

A second wheel (21) and third wheel (31) are mounted respectively on the braking element (41) as well as a friction element (51). When the second wheel is rotated in one direction or the other, the friction brake (51) will be rotated as a result of the engagement between the annulus gear (22) of the second wheel and the annulus gear (52) of the friction brake. A third wheel (31) can rotate freely. The braking element (41) has two outer positions which are determined by the design of the slot (56a and 56b).

In FIG. 5 the contact plates (61 and 62) mounted on the screen/display (70) and holder (75), are shown respectively. The screen/display (70) is positioned in its highest position relative to the holder (75).

The contact plates (61 and 62) mounted on the screen/display (70) and holder (75), are shown in FIG. 6 respectively. The screen/display (70) is positioned in its lowest position relative to the holder (75).

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A braking system for holding a screen in a desired position relative to a fixed holder wherein the braking system comprises:
   a first wheel configured to be mounted on one of the fixed holder or the screen,
   an elongated base to be provided on the other of the fixed holder or the screen, with the elongated base in contact with the first wheel, so that when the elongated base is moved relative to the first wheel, the first wheel is rotated, and
   a braking module comprising a second wheel and a third wheel, wherein the second wheel is arranged in contact with an adjustable friction brake,
   wherein the first wheel is configured to always be in contact with either the second wheel or the third wheel of the braking module,
   wherein the braking module is rotatably arranged relative to either the screen or the holder to be rotated between a position where the second wheel of the braking module is in contact with the first wheel and a position where the third wheel of the braking module is in contact with the first wheel.

2. The braking system according to claim 1, wherein a linear movement of the elongated base is transferred to a circular movement of the first wheel by frictional force arising between the elongated base and the first wheel.

3. The braking system according to claim 1, wherein a rotational movement of the first wheel is transferred to the second wheel or the third wheel by frictional force arising between the first wheel and the second wheel or between the first wheel and the third wheel.

4. The braking system according to claim 1, wherein the first wheel and the elongated base further comprise teeth configured to engage with each other for transferring a circular movement to a linear movement or vice versa.

5. The braking system according to claim 1, wherein the first wheel, the second wheel, and the third wheel further comprise teeth configured to engage with each other for transferring a circular movement from one wheel to the other.

6. The braking system according to claim 1, wherein the first wheel further comprises two peripheries which can be brought into contact with the elongated base and either the second or the third wheel via teeth.

7. The braking system according to claim 1, further comprising one or more component made of metal and/or plastic and/or composite material.

8. A method for positioning and holding a screen in an optional position, wherein the screen is arranged in connection with a braking system according to claim 1.

* * * * *